(12) United States Patent
Ono

(10) Patent No.: US 7,732,527 B2
(45) Date of Patent: Jun. 8, 2010

(54) WATER-SOLUBLE POLYMERS REDUCED IN MOLECULAR WEIGHT, PROCESS FOR PRODUCTION THEREOF AND USAGE THEREOF

(75) Inventor: Motosuke Ono, Tokyo (JP)

(73) Assignee: Hymo Corporation, Tokyo (JP)

( * ) Notice: Subject to any disclaimer, the term of this patent is extended or adjusted under 35 U.S.C. 154(b) by 769 days.

(21) Appl. No.: 10/546,093

(22) PCT Filed: Feb. 19, 2004

(86) PCT No.: PCT/JP2004/001896

§ 371 (c)(1),
(2), (4) Date: Aug. 19, 2005

(87) PCT Pub. No.: WO2004/074331

PCT Pub. Date: Sep. 2, 2004

(65) Prior Publication Data

US 2006/0148949 A1    Jul. 6, 2006

(30) Foreign Application Priority Data

Feb. 21, 2003  (JP) ............................. 2003-043658

(51) Int. Cl.
*C08F 261/04* (2006.01)
(52) U.S. Cl. ........................... 525/56; 525/59; 525/279; 525/293; 525/313; 525/330.3
(58) Field of Classification Search ................... 525/56, 525/59, 279, 293, 313, 330.3
See application file for complete search history.

(56) References Cited

U.S. PATENT DOCUMENTS

| | | | | |
|---|---|---|---|---|
| 4,182,807 A | * | 1/1980 | Vanlautem et al. | 525/387 |
| 5,520,849 A | * | 5/1996 | Eiffler | 252/500 |
| 6,187,853 B1 | * | 2/2001 | Takeda et al. | 524/457 |

FOREIGN PATENT DOCUMENTS

| | | |
|---|---|---|
| JP | 53-133292 | 11/1978 |
| JP | 2004-002692 | 1/2004 |
| JP | 2004-091576 | 3/2004 |
| WO | WO 02100944 | 12/2000 |
| WO | WO 02/100944 | * 12/2002 |

* cited by examiner

*Primary Examiner*—Robert D. Harlan
(74) *Attorney, Agent, or Firm*—Weingarten, Schurgin, Gagnebin & Lebovici LLP

(57) ABSTRACT

The invention relates to water-soluble polymers reduced in molecular weight, a process for production of the same, and usage thereof. It makes it possible to obtain water-soluble polymers reduced in molecular weight by a simple procedure and in an economical and simple manner by subjecting either an aqueous solution admixed with an aqueous solution of an oxidizing agent and containing an amount within the range of 10-60% by mass of a water-soluble polymer and having a viscosity of not lower than 3000 mPa·s or a granular composition admixed or impregnated with an aqueous solution of an oxidizing agent and containing an amount within the range of 10-60% by mass of a water-soluble polymer to oxidation reaction, not by the method of polymerization at elevated temperatures, which is an energy-consuming method, or by the method of polymerization using large amounts of a chain transfer agent and/or an initiator, which is one of the raw materials, and these water-soluble polymer reduced in molecular weight can be used fixing agents for improving the water resistance and/or light fastness of printed matters and, further, the solution viscosity of this water-soluble polymer reduced in molecular weight can be adjusted, hence the handleability thereof, among others, can be adjusted, by incorporating a water-soluble salt and/or a polymer additive in these water-soluble polymers reduced in molecular weight to give compositions comprising the water-soluble polymer reduced in molecular weight.

6 Claims, No Drawings

WATER-SOLUBLE POLYMERS REDUCED IN MOLECULAR WEIGHT, PROCESS FOR PRODUCTION THEREOF AND USAGE THEREOF

This application is a §371 national phase filing of PCT/JP2004/001896 filed Feb. 19, 2004, and claims priority to a Japanese application No. 2003-043658 filed Feb. 21, 2003.

TECHNICAL FIELD

This invention relates to a water-soluble polymer reduced in molecular weight, a process for the production thereof, and a usage thereof and, more particularly, to a water-soluble polymer reduced in molecular weight as produced by causing an aqueous solution of an oxidizing agent to be contained in a water-soluble polymer either in an aqueous solution form or a granular form and then reducing the degree of polymerization of the polymer by oxidation without stirring. Further, it relates to a usage of such water-soluble polymer reduced in molecular weight as a fixing agent in ink jet printing compositions.

BACKGROUND ART

Among water-soluble polymeric substances, low-polymerization-degree polymers, in particular, are applied as surface coating agents for various grades of printing paper, cement additives, pigment dispersants, hydraulic fluid components, metal-collecting agents, or builders for detergents or the like, and further developments in the application thereof in the future are expected.

Low-polymerization-degree polymers have so far been synthesized by polymerization of vinyl compounds or by polycondensation reactions. Among them, the methods employed in polymerizing vinyl compounds comprise using a chain transfer agent and/or a polymerization initiator in large amounts or carrying out the polymerization at an elevated temperature, for instance. On the other hand, polycondensation reactions give only low-molecular weight polymers from the polymerization degree viewpoint and, from the ionicity viewpoint, cationic ones are readily formed, and the degree of freedom is restricted and it is difficult to arbitrarily select the polymerization degree and ionicity, for instance. Therefore, vinyl compound-derived polymers are most convenient from the application viewpoint.

As regards the reaction temperature, it is a common-sense formula to produce low-polymerization-degree polymers by carrying out the polymerization at elevated temperatures, and this fits one of the theories of polymerization. The grounds for carrying out the polymerization at elevated temperatures are that the rate of decomposition of the polymerization initiator is rapid and that the chain transfer reaction is accelerated. As a result, the degree of polymerization decreases. When the polymerization is carried out at elevated temperatures, the side chain active groups may undergo modification or denaturation, for instance, sometimes unfavorably to the intended purpose and for the later application thereof. It is energy-consuming and uneconomical to carry out the polymerization at elevated temperatures for synthesizing polymers with a low degree of polymerization. The method comprising adding a chain transfer agent in large amounts not only leads to an increased cost but also allows the chain transfer agent fragments to bind to the polymer molecules formed to thereby delicately influence the physical properties of the polymer and also influence the purity thereof.

A method so far used for reducing the molecular weight of a polymer comprises cleaving the polymer with an oxidizing agent and, in that case, the polymer is dissolved in a solvent, an oxidizing agent solution is added to the resulting solution and the oxidation-based cleavage reaction is allowed to proceed with stirring. For example, Reference 1 [Vysocomolecul. Soedin. Ser. B, Vol. 126, No. 5, pp. 340-344 (1984)] discloses a method which comprises adding, to a 0.4% aqueous solution of polyacrylamide, an amount of 0.5-5% relative to the polymer of potassium persulfate and carrying out the cleavage reaction at 50° C.

It is an object of the present invention to provide low-polymerization-degree polymers producible by a simple procedure at a low cost, not by the high-temperature polymerization method, which is an energy-consuming method, or the polymerization method using a chain transfer agent and/or a polymerization initiator in large amounts.

DISCLOSURE OF INVENTION

Intensive investigations made by the present inventor to accomplish the above object have now led to completion of such inventions as described below.

Thus, the invention set forth relates to a water-soluble polymer reduced in molecular weight as obtained by subjecting either an aqueous solution admixed with an aqueous solution of an oxidizing agent and containing an amount within the range of 10-60% by mass of a water-soluble polymer and having a viscosity of not lower than 3000 mPa·s or a granular composition admixed or impregnated with an aqueous solution of an oxidizing agent and containing an amount within the range of 10-60% by mass of a water-soluble polymer to oxidation reaction to thereby reduce the degree of polymerization of the water-soluble polymer.

The invention set forth relates to a water-soluble polymer reduced in molecular weight as defined characterized in that the oxidation reaction is carried out substantially without stirring.

The invention set forth relates to a water-soluble polymer reduced in molecular weight as defined characterized in that the water-soluble polymer is a vinyl polymer.

The invention set forth relates to a water-soluble polymer reduced in molecular weight as defined characterized in that the water-soluble polymer is a cationic water-soluble polymer comprising at least one structural unit selected from among the cationic structural units respectively represented by the general formulas (1) to (4) given below:

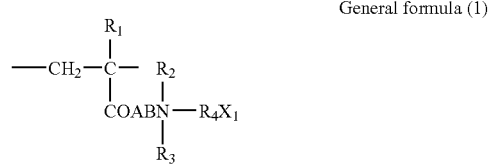

General formula (1)

(In the formula, $R_1$ is a hydrogen atom or a methyl group, $R_2$ and $R_3$ each is an alkyl or alkoxyl group containing 1-3 carbon atoms, $R_4$ is a hydrogen atom, an alkyl or alkoxyl group containing 1-3 carbon atoms or a benzyl group, and they may be the same or different; A represents an oxygen atom or NH, B represents an alkylene or alkoxylene group containing 2-4 carbon atoms, and $X_1$ represents an anion.)

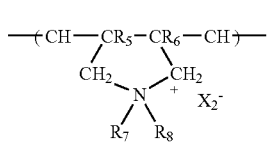

General formula (2)

(In the formula, $R_5$ and $R_6$ each represents a hydrogen atom or a methyl group, $R_7$ and $R_8$ each represents an alkyl or alkoxyl group containing 1-3 carbon atoms or a benzyl group, and $X_2$ represents an anion.)

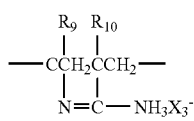

General formula (3)

(In the formula, $R_9$ and $R_{10}$ each represents a hydrogen atom or a methyl group and $X_3$ represents an anion.)

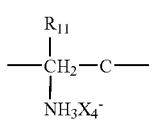

General formula (4)

(In the formula, $R_{11}$ represents a hydrogen atom or a methyl group and $X_4$ represents an anion.)

The invention set forth relates to a water-soluble polymer reduced in molecular weight as defined characterized in that the water-soluble polymer is an amphoteric water-soluble polymer comprising at least one structural unit selected from among the cationic structural units respectively represented by the general formulas (1) to (4) given above and at least one anionic structural unit represented by the general formula (5) given below:

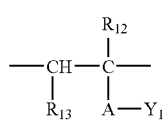

General formula (5)

(In the formula, $R_{12}$ represents a hydrogen atom or a methyl or carboxymethyl group, A represents $SO_3$, $C_6H_4SO_3$, $CONHC(CH_3)_2CH_2SO_3$, $C_6H_4COO$ or COO, $R_{13}$ represents a hydrogen atom or $COOY_2$, and $Y_1$ and $Y_2$ each represents a hydrogen atom or a cation.)

The invention set forth relates to a water-soluble polymer reduced in molecular weight as defined characterized in that the water-soluble polymer is a nonionic water-soluble polymer comprising at least one structural unit selected from among nonionic structural units represented by the general formula (6) given below:

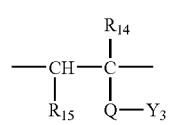

General formula (6)

(In the formula, $R_{14}$ represents a hydrogen atom or a methyl group, $R_{15}$ represents a hydrogen atom or a lower alkyl group, and Q represents $NHCOR_{16}$ in which $R_{16}$ is a hydrogen atom or a lower alkyl group, or COAB in which A is NH or O and B is a hydrogen atom or a lower alkylene group, and $Y_3$ represents a hydrogen atom.)

The invention set forth relates to a water-soluble polymer reduced in molecular weight as defined characterized in that a water-soluble polymer in powder form with a concentration of not lower than 80% by mass is used as the water-soluble polymer.

The invention set forth relates to a water-soluble polymer reduced in molecular weight as defined characterized in that it is a product obtained by subjecting an aqueous solution admixed with an aqueous solution of an oxidizing agent and containing an amount within the range of 20-60% by mass of a water-soluble polymer and having a viscosity of not lower than 3000 mPa·s or a granular composition admixed or impregnated with an aqueous solution of an oxidizing agent and containing an amount within the range of 20-60% by mass of a water-soluble polymer to oxidation reaction to thereby reduce the degree of polymerization of the water-soluble polymer.

The invention set forth relates to a process for producing water-soluble polymers reduced in molecular weight characterized in that it comprises subjecting an aqueous solution admixed with an aqueous solution of an oxidizing agent and containing an amount within the range of 10-60% by mass of a water-soluble polymer and having a viscosity of not lower than 3000 mPa·s or a granular composition admixed or impregnated with an aqueous solution of an oxidizing agent and containing an amount within the range of 10-60% by mass of a water-soluble polymer to oxidation reaction to thereby reduce the degree of polymerization of the water-soluble polymer.

The invention set forth relates to a water-soluble polymer composition characterized in that it comprises a water-soluble polymer reduced in molecular weight as defined together with a water-soluble salt and/or a polymer additive caused to coexist.

The invention set forth relates to a water-soluble polymer composition as defined characterized in that the coexisting salt is an organic acid salt or an organic base salt.

The invention set forth relates to a water-soluble polymer composition as defined characterized in that the coexisting polymer additive is polyethylene glycol, polypropylene glycol, polyglycerol, polyvinylpyrrolidone, polyethylenimine or a polymeric compound comprising at least one of the structural units represented by the general formulas (1) to (6) given hereinabove.

The invention set forth relates to a method of using water-soluble polymers reduced in molecular weight characterized in that it comprises applying a water-soluble polymer reduced in molecular weight as defined or a water-soluble polymer composition as defined as a surface treatment agent, to an ink jet printing medium in the manner of coating.

The water-soluble polymer reduced in molecular weight according to the invention is produced by admixing or impregnating an aqueous solution or granular composition comprising a water-soluble polymer with an aqueous solution of an oxidizing agent and carrying out the oxidation reaction without stirring to thereby reduce the degree of polymerization to give an aqueous solution having good fluidity.

More specifically, an aqueous solution of a water-soluble monomer or monomers with a concentration of 30-60% by mass, for instance, is subjected to polymerization, the polymer obtained is granulated to a grain size of 0.5 to several millimeters, the granulation product is placed, as the water-soluble polymer-containing granular composition, in a vessel and impregnated with an aqueous solution of hydrogen peroxide, for instance, and the oxidation reaction is allowed to proceed for cleaving molecules without stirring for several hours to several days while the vessel outside is maintained at a constant temperature. After the reaction, the product can be obtained in the form of an aqueous low-polymerization-degree polymer solution having good fluidity. Also employable as other water-soluble polymer-containing granular compositions are polymer flocculants and like powder-form products as well as methylcellulose, sodium alginate, pectin and like water-soluble natural polysaccharides. The process is particularly effective in treating vinyl polymers, among others.

The oxidizing agent to be used in the practice of the invention includes ammonium peroxodisulfate, potassium peroxodisulfate, sodium peroxodisulfate, sodium hypochlorite, hydrogen peroxide, and the like. Hydrogen peroxide is preferred, however. For quenching the oxidizing agent remaining in the solution after reaction, the oxidation reaction is terminated by adding sodium sulfite, sodium hydrogen sulfite, sodium thiosulfate, formic acid, ascorbic acid, erythorbic acid or the like. The level of addition of such a reducing agent is roughly estimated at 5-25 mole percent relative to the oxidizing agent added. For effective reducing agent treatment, it is recommended that the solution after reaction be adjusted to pH 4-7 and then the reducing agent be added.

While stirring is impossible in the early stage of reaction, hence no stirring is made, the rate of reaction is greatly influenced by the reaction temperature, namely the external heating temperature. Thus, when rapid progress of the reaction is desired, the external heating temperature is set at a rather high level and, for slow progress, the external heating temperature is set at a rather low level.

An increased oxidation reaction temperature may result in unfavorable side reactions in some instances depending on the composition of the water-soluble polymer; hence care should be taken. The external heating temperature is generally 5-60° C., preferably 20-50° C.

The reaction concentration of the water-soluble polymer in the aqueous solution admixed with the aqueous oxidizing agent solution or the reaction concentration of the water-soluble polymer in the granular composition admixed or impregnated with the aqueous oxidizing agent solution can be increased since no stirring is required. Thus, it is 10-60% by mass, preferably 20-60% by mass, most preferably 25-50% by mass.

The cationic water-soluble polymer among the water-soluble polymers that can be reduced in molecular weight by the oxidation reaction in accordance with the invention comprises at least one structural unit selected from among the structural units respectively represented by the general formulas (1) to (4) given hereinabove and may comprise a nonionic structural unit or units according to need.

The polymer comprising a structural unit represented by the general formula (1) is a (meth)acrylic cationic polymer. This polymer can be synthesized by polymerization of a cationic monomer(s) or a copolymerization thereof with a nonionic monomer(s). Examples of the cationic monomer are dialkylaminoalkyl (meth)acrylates such as dimethylaminoethyl (meth)acrylate and diethylaminoethyl (meth)acrylate, or quaternary ammonium salts derived from these monomers by quaternization with a monohalide. As examples thereof, there may be mentioned (meth)acryloyloxyethyltrimethylammonium chloride, (meth)acryloyloxy-2-hydroxypropyltrimethylammonium chloride, and (meth)acryloylaminopropyltrimethylammonium chloride. It is also possible to use two or more of these cationic monomers in combination. The mole percent of the cationic monomer is 5-100 mole percent, preferably 10-100 mole percent, most preferably 20-100 mole percent.

The use of acrylamide as an example of the nonionic monomer is most preferred. It is possible, however, to subject another or other nonionic monomers to copolymerization with acrylamide. As examples of such monomers, there may be mentioned N,N-dimethylacrylamide, vinyl acetate, acrylonitrile, methyl acrylate, 2-hydroxyethyl (meth)acrylate, diacetone acrylamide, N-vinylpyrrolidone, N-vinylformamide, N-vinylacetamide and acryloylmorpholine. The mole percent of the nonionic monomer is 0-95 mole percent, preferably 0-90 mole percent, most preferably 0-80 mole percent.

The cationic polymer comprising a structural unit represented by the general formula (2) can be synthesized by copolymerizing a dialkyldi(meth)allylammonium salt(s) and a nonionic monomer(s). Examples of the dialkyldi(meth)allylammonium salt are dimethyldi(meth)allylammonium chloride, diethyldi(meth)allylammonium chloride, and methylbenzyldi(meth)allylammonium chloride. Usable as the nonionic monomer(s) are those nonionic monomers mentioned above. The mole percent of the cationic monomer(s) is 5-100 mole percent, preferably 10-100 mole percent, most preferably 20-100 mole percent. The mole percent of the nonionic monomer(s) is the same as mentioned above.

The cationic polymer comprising a structural unit represented by the general formula (3) is a vinylamidine-based polymer. This polymer can be synthesized by subjecting a copolymer of an N-vinylcarboxylic acid amide and (meth)acrylonitrile to hydrolysis with an acid. As examples of the monomer N-vinylcarboxylic acid, there may be mentioned N-vinylformamide and N-vinylacetamide, among others. The acid to be used is preferably an inorganic strong acid, for example hydrochloric acid or nitric acid, or p-toluenesulfonic acid and the like. As for the vinylnitrile to be copolymerized, acrylonitrile is the most common one. The mole percent of the amidine groups in the molecule after hydrolysis is 5-100 mole percent, preferably 10-100 mole percent, most preferably 20-100 mole percent. The nonionic structural units are the unhydrolyzed carboxylic acid amide group and unreacted nitrile group and amount to 0-95 mole percent, preferably 0-90 mole percent, most preferably 0-80 mole percent.

The cationic polymer comprising a structural unit represented by the general formula (4) is a vinylamine-based polymer. This polymer can be synthesized by subjecting an N-vinylcarboxylic acid amide polymer to hydrolysis with an acid or alkali. The acid to be used is preferably an inorganic strong acid, for example hydrochloride acid or nitric acid, or p-toluenesulfonic acid or the like. The alkali is preferably a caustic alkali, such as sodium hydroxide or potassium hydroxide. As example of the monomer N-vinylcarboxylic acid, there may be mentioned N-vinylformamide and N-vinylacetamide. The mole percent of the cationic groups in the molecule after hydrolysis is 5-100 mole percent, preferably 10-100 mole percent, most preferably 20-100 mole percent. The nonionic structural unit, which is the unhydrolyzed carboxylic acid amide group, amounts to 0-95 mole percent, preferably 0-90 mole percent, most preferably 0-80 mole percent.

The amphoteric polymers to be used in the practice of the invention each comprises 5-100 mole percent of at least one structural unit selected from among the structural units represented by the general formulas (1) to (4) given hereinabove, 5-60 mole percent of at least one anionic group selected from the structural units represented by the general formula (5) given hereinabove and 0-90 mole percent of a nonionic structural unit(s).

These amphoteric polymers can be synthesized by simultaneously subjecting the anionic monomer(s) to copolymerization on the occasion of producing the cationic polymers comprising one or more of the structural units represented by the general formulas (1) to (4). The anionic monomer may be a sulfone group-containing one or a carboxyl group-containing one, for instance, and both may be used in combination. Examples of the sulfone group-containing monomer are vinylsulfonic acid, vinylbenzenesulfonic acid and 2-acrylamido-2-methylpropanesulfonic acid. Examples of the carboxyl group-containing monomer are methacrylic acid, acrylic acid, itaconic acid, maleic acid and p-carboxystyrene. As for the mole percent of the cationic groups in the molecule of those amphoteric polymers, at least one structural unit selected from among the structural units represented by the general formulas (1) to (4) given hereinabove amounts to 5-100 mole percent; the mole percent of the anionic group, hence of the structural unit represented by the general formula (5) given hereinabove, is 5-60 mole percent, and the nonionic structural unit amounts to 0-90 mole percent.

The anionic polymer to be used in the practice of the invention is one synthesized by polymerization of an anionic monomer or copolymerization thereof with a nonionic monomer. The anionic monomer may be a sulfone group-containing one or a carboxyl group-containing one, for instance, and both may be used in combination. Examples of the sulfone group-containing monomer are vinylsulfonic acid, vinylbenzenesulfonic acid and 2-acrylamido-2-methylpropanesulfonic acid. Examples of the carboxyl group-containing monomer are methacrylic acid, acrylic acid, itaconic acid, maleic acid and p-carboxystyrene. As for the mole percent of these anionic groups in the anionic polymer, the polymer comprises 2-100 mole percent of the structural unit(s) represented by the general formula (5) given hereinabove and 0-98 mole percent of a nonionic structural unit(s).

The nonionic polymer to be used in the practice of the invention is synthesized by homopolymerization of a nonionic monomer or copolymerization thereof with at least one other nonionic monomer. The use of acrylamide as an example of the nonionic monomer is most preferred. It is possible, however, to subject another or other nonionic monomers to copolymerization with acrylamide. As examples of such monomers, there may be mentioned N,N-dimethylacrylamide, vinyl acetate, acrylonitrile, methyl acrylate, 2-hydroxyethyl (meth)acrylate, diacetone acrylamide, N-vinylpyrrolidone, N-vinylformamide, N-vinylacetamide and acryloylmorpholine. The polymer may be a copolymer obtained by using styrene, octyl acrylate or a like water-insoluble monomer as a comonomer provided that the polymer is soluble in water.

The nonionic, cationic or amphoteric polymer to be used as the raw material has a molecular weight of $1 \times 10^4$ to $2000 \times 10^4$, preferably $100 \times 10^4$ to $2000 \times 10^4$. In the practice of the invention, the aqueous solution admixed with the aqueous oxidizing agent solution and containing an amount within the range of 10-60% by mass of the water-soluble polymer has a high viscosity of 3000 mPa·s or higher. The oxidation reaction without stirring, however, can reduce the degree of polymerization of the water-soluble polymer to give an aqueous solution having good fluidity.

Alternatively, in accordance with the invention, a granular composition admixed or impregnated with the aqueous oxidizing agent solution and containing an amount within the range of 10-60% by mass of the water-soluble polymer can be converted to an aqueous solution having good fluidity by reducing the degree of polymerization of the water-soluble polymer by the oxidation reaction.

The water-soluble polymer after oxidation reaction has a molecular weight of 1,000 to 3,000,000, preferably 1,000 to 500,000.

The water soluble polymer reduced in molecular weight as synthesized according to the invention can be expected to be applicable as a pretreatment agent for old papers and magazines or like papermaking raw materials having a high mechanical pulp content, as an ink jet fixing agent, as a dispersant for use in dispersion polymerization, as a substitute for an inorganic coagulant for use in sludge dewatering or waste water treatment, as a stabilizer for emulsion products, as a builder for detergents and the like, and as a raw material for providing a reactive group(s) during or after polymerization to give reactive low-polymerization-degree polymers useful in various coating compositions, for instance.

In cases where the water-soluble polymer reduced in molecular weight according to the invention is used as an ink jet fixing agent, the polymer can be used, for example, by applying to the surface of paper or a like recoding medium or by incorporating into an ink composition. On that occasion, a plurality of ink jet fixing agents produced by the process of the invention or some other method may also be used in combination.

For the coating purposes, the polymer can be used by compounding with one or more of binders, pigments, dyes, sizing agents and others known in the art according to need, and the coating weight, as the water-soluble polymer reduced in molecular weight, is preferably 0.1 to 10.0 $g/m^2$, more preferably 0.2 to 5.0 $g/m^2$. To avoid an unnecessary increase in the viscosity of the coating composition or ink composition in which the polymer is incorporated, the water-soluble polymer reduced in molecular weight has a molecular weight of 1000 to $100 \times 10^4$, preferably 1000 to $10 \times 10^4$.

The water-soluble dyes used in ink jet recording are generally anionic, so that cationic water-soluble polymers are generally used as the ink jet fixing agents. Therefore, as for the compositions of the water-soluble polymers to be reduced in molecular weight, cationic structural unit-containing ones, such as polyvinylamidine type, polydiallylamine type, polyvinylamine type and polyamino(meth)acrylate type ones, are preferred from the performance characteristics viewpoint.

Further, for the purpose of adjusting the viscosity or improving the light resistance of an aqueous solution of the water-soluble polymer reduced in molecular weight or for the purpose of preventing paper yellowing after application, it is more effective to use the water-soluble polymer reduced in molecular weight according to the invention in admixture with a water-soluble salt and/or a polymer additive.

The water-soluble salt to be used for such purposes is not particularly restricted but may comprise one single species or a combination of a plurality of species. Preferably, the most suited salt species and the concentration thereof are to be selected and used according to the concentration, composition and molecular weight of the water-soluble polymer reduced in molecular weight. As for the method of causing a water-soluble salt to coexist, the salt as such may be added or the corresponding acid and base may be added separately, or the salt may be formed by neutralizing the acid or base already existing in the system as an impurity.

The procedure for causing the water-soluble salt to coexist may be carried out before, during or after the oxidation reaction mentioned above. When the addition is made before or during the oxidation reaction, the pH of the system should preferably be not outside the pH range appropriate for the oxidation reaction.

As examples of the acid to constitute the water-soluble salt mentioned above, there may be mentioned inorganic acids such as hydrochloric acid, sulfuric acid, sulfurous acid, carbonic acid, phosphoric acid and boric acid, and organic acids such as formic acid, acetic acid, n-butyric acid, pentadecafluorooctanoic acid, pentafluoropropionic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, oxalic acid, benzoic acid, picric acid, trimethylbenzoic acid, thymol blue, salicylic acid, 5-aminosalicylic acid, o-methoxybenzoic acid, 1,6-dinitro-4-chlorophenol, 2,6-dinitrophenol, 2,4-dinitrophenol, bromophenol blue, mandelic acid, phthalic acid, isophthalic acid, maleic acid, fumaric acid, malonic acid, tartaric acid, citric acid, lactic acid, succinic acid, α-alanine, β-alanine, glycine, serine, glycolic acid, thioglycolic acid, ethylenediamine-N,N-diacetic acid, ethylenediamine-N,N,N,N-tetraacetic acid, aminonaphtholsulfonic acid, metanilic acid, sulfanilic acid, allylsulfonic acid, laurylsulfuric acid, xylenesulfonic acid, chlorobenzenesulfonic acid, 1-propanesulfonic acid, benzenesulfonic acid, styrenesulfonic acid, p-toluenesulfonic acid and naphthalenesulfonic acid.

As examples of the base to constitute the water-soluble salt mentioned above, there may be mentioned inorganic bases such as alkali metal hydroxides, e.g. sodium hydroxide, potassium hydroxide and lithium hydroxide, alkaline earth metal hydroxides, ammonia, hydroxylamine, hydrazine, and organic bases such as formamide, amidines, guanidine, aminoguanidine, methylamine, dimethylamine, trimethylamine, ethylamine, diethylamine, triethylamine, monoallylamine, diallylamine, cyclohexylamine, monoethanolamine, diethanolamine, triethanolamine, dimethylethanolamine, 2-ethylaminoethanol, diethylethanolamine, 2-aminoethylethanolamine, 3-amino-1-propanol, isopropanolamine, ethylenediamine, N,N-diethylethylenediamine, tetramethylethylenediamine, 1,2-propanediamine, trimethylhexamethylenediamine, pentamethylenediamine, diethylenetriamine, N-(hydroxyethyl)diethylenetriamine, triethylenetetramine, teteraethylenepentamine, polyoxypropylenepolyamine, 2-aminothiazole, imidazole, picoline, pipecoline, piperazine, piperidine, pyridine, pyrazine, pyrrolidine and morpholine.

On the occasion of applying an aqueous solution of the water-soluble polymer reduced in molecular weight as produced by the process of the invention to the paper surface as an ink jet fixing agent, the coexistence of an inorganic salt high in hydration potential tends to adversely affect the physical properties and drying characteristics of the coating composition containing the same in many cases and, therefore, an organic acid salt or organic base salt is more preferred as the salt to be caused to coexist in the aqueous solution of the water-soluble polymer reduced in molecular weight.

The composition of the polymer additive to be caused to coexist in the aqueous solution of the water-soluble polymer reduced in molecular weight in the practice of the invention is not particularly restricted. The additive may comprise one single species or a combination of a plurality of species. Preferably, the most suited polymer additive composition, molecular weight and concentration are to be selected and used according to the concentration, composition and molecular weight, among others, of the water-soluble polymer reduced in molecular weight, which is the main component.

When the main component water-soluble polymer reduced in molecular weight is an ionic polymer, for instance, polymer additives of the same ionicity or nonionic polymer additives can be used adequately. The composition of the polymer additive may be same as the main component water-soluble polymer reduced in molecular weight but, in that case, the effect of reducing or increasing the viscosity of the aqueous solution of the water-soluble polymer reduced in molecular weight cannot be obtained unless there is a certain extent of difference in molecular weight. When the polymer additive is an electrolyte, a salt thereof may also be used. As for the method of causing the polymer additive to coexist, the procedure for causing the polymer additive to coexist may be carried out before, during or after the oxidation reaction mentioned above. When the addition is made before or during the oxidation reaction, the pH of the system should preferably be not outside the pH range appropriate for the oxidation reaction.

As regards the specific composition of the polymer additive, polyethylene glycol, polypropylene glycol, polyglycerol, polyvinylpyrrolidone, polyethylenimine, or polymer compounds comprising at least one of the structural units represented by the general formula (1) to (6) given hereinabove are preferred, since these species which have an appropriate molecular weight can be obtained with ease. In addition, the polymer additive may further comprise such a nonionic structural unit as N,N-dimethylacrylamide, vinyl acetate, acrylonitrile, methyl acrylate, 2-hydroxyethyl (meth) acrylate, diacetone acrylamide, N-vinylpyrrolidone, acryloylmorpholine, styrene, vinyltoluene, vinylnaphthalene, butadiene, isoprene, ethylene or propylene so that the hydrophilicity of the polymer additive may be optimized.

The polymer additive has a weight average molecular weight of 1,000 to $100 \times 10^4$, preferably 1,000 to $50 \times 10^4$. At levels higher than $100 \times 10^4$, the viscosity of the mixture increases, causing troubles in using the mixture as an ink jet fixing agent. The total level of addition of the water-soluble salt and polymer additive to the water-soluble polymer reduced in molecular weight is 0.1 to 50% by mass, preferably 0.1 to 30% by mass, relative to the whole liquid amount.

BEST MODES FOR CARRYING OUT THE INVENTION

The following examples and comparative examples illustrate the present invention in further detail. The following examples are, however, by no means limitative of the scope of the invention, unless there is a departure from the gist or spirit of the invention.

"%" means "% by mass".

EXAMPLE 1

In a beaker, there were placed 87 g of a 35% aqueous solution of hydrogen peroxide and 470.2 g of distilled water and, after obtaining a homogeneous solution, 300 g of a powdery acryloyloxyethyltrimethylammonium chloride/acrylamide copolymer (average molecular weight about $1000 \times 10^4$) was added. The mixture was stirred until a condition of roughly uniform dispersion was achieved; it soon became a gel-like mass. This was maintained in a water bath at 50° C. for 15 days, whereupon it became a uniform aqueous polymer solution. A 171.4-g portion of this unadjusted aqueous polymer solution was taken out, the pH of the aqueous solution was adjusted to 5.5, the unreacted hydrogen peroxide was quenched by adding 1.9 g of powdery sodium hydrogen sulfite, and the polymer concentration was adjusted to 30% by adding distilled water to give 200 g of the desired aqueous polymer solution.

The average molecular weight of the polymer in this aqueous solution was determined by GPC and found to be about 40,000. The viscosity of this aqueous polymer solution was determined using a rotational viscometer and found to be 460 mPa·s. The results are shown in Table 1.

[GPC Measurement Conditions]

Apparatus constituents: Nihon Bunko (JASCO)HPLC (BIP-1, DG-3310), Showa Denko SE-51, Tosoh TSK gel, GMPW, eluent: 0.5 M acetic acid+0.5 M sodium acetate, flow rate: 1.0 ml/min., molecular weight standard substance: polyethylene glycol.

EXAMPLE 2

In a beaker, there were placed 87 g of a 35% aqueous solution of hydrogen peroxide and 280.2 g of distilled water and, after obtaining a homogeneous solution, 300 g of powdery poly(diallyldimethylammonium chloride) (average molecular weight about $80\times10^4$) was further added. The mixture was stirred to give a uniform aqueous solution. The concentration of the water-soluble polymer in the aqueous solution was 45%, and the viscosity was 5,600 mPa·s. This aqueous solution was maintained in a water bath at 40° C. for 15 days, whereupon a distinct decrease in viscosity was observed. A 171.4-g portion of this unadjusted aqueous polymer solution was taken out, the pH of the aqueous solution was adjusted to 5.5, the unreacted hydrogen peroxide was quenched by adding 1.9 g of powdery sodium hydrogen sulfite, and the polymer concentration was adjusted to 30% by adding distilled water to give 200 g of the desired aqueous polymer solution.

The average molecular weight of the polymer in this aqueous solution was determined by GPC (gel permeation chromatography) and found to be about 40,000. The viscosity of this aqueous polymer solution was determined using a rotational viscometer and found to be 400 mPa·s. The results are shown in Table 1.

EXAMPLE 3

In a beaker, there were placed 13.0 g of a 35% aqueous solution of hydrogen peroxide and 98.4 g of distilled water and, after obtaining a homogeneous solution, 60 g of powdery poly(diallyldimethylammonium chloride) (average molecular weight about $80\times10^4$) was further added. The mixture was stirred to give a viscous aqueous solution. This aqueous solution was maintained in a water bath at 50° C. for 15 days, whereupon a distinct decrease in solution viscosity was observed. The pH of the aqueous solution was adjusted to 5.5, the unreacted hydrogen peroxide was quenched by adding 1.4 g of powdery sodium hydrogen sulfite, and the polymer concentration was adjusted to 30% by adding distilled water to give 200 g of the desired aqueous polymer solution.

The average molecular weight of the polymer in this aqueous solution was determined by GPC (gel permeation chromatography) and found to be about $20\times10^4$. The results are shown in Table 1.

EXAMPLE 4

In a beaker, there were placed 43.5 g of a 35% aqueous solution of hydrogen peroxide and 513.7 g of distilled water and, after obtaining a homogeneous solution, 300 g of powdery polyamidine (average molecular weight about $300\times10^4$) was further added. The mixture was stirred to attain a condition of roughly uniform dispersion; it soon became a gel-like mass. This was maintained in a water bath at 50° C. for 5 days, whereupon it became a uniform solution. The results are shown in Table 1.

A 171.4-g portion of this unadjusted aqueous polymer solution was taken out, the pH of the aqueous solution was adjusted to 5.5, the unreacted hydrogen peroxide was quenched by adding 0.9 g of powdery sodium hydrogen sulfite and, further, the polymer concentration was adjusted to 30% by adding distilled water to give 200 g of the desired aqueous polymer solution. The average molecular weight of the polymer in this aqueous solution was determined by GPC and found to be about $3\times10^4$.

Further, the viscosity of this aqueous polymer solution was determined using a rotational viscometer and found to be 196 mPa·s. The results are shown in Table 1.

EXAMPLE 5

In a beaker, there were placed 4.3 g of a 35% aqueous solution of hydrogen peroxide and 107.1 g of distilled water and, after obtaining a homogeneous solution, 60 g of powdery polyamidine (average molecular weight about $300\times10^4$) was further added. The mixture was stirred to attain a condition of roughly uniform dispersion; it soon became a gel-like mass. This was maintained in a water bath at 50° C. for 5 days, whereupon it became a uniform solution. This solution was adjusted to pH 5.5, the unreacted hydrogen peroxide was then quenched by adding 0.5 g of powdery sodium hydrogen sulfite and, further, the polymer concentration was adjusted to 30% by adding distilled water to give 200 g of the desired aqueous polymer solution. The average molecular weight of the polymer in this aqueous solution was determined by GPC and found to be about $15\times10^4$. The results are shown in Table 1.

EXAMPLE 6

In a beaker, there were placed 17.4 g of a 35% aqueous solution of hydrogen peroxide, 93 g of distilled water and 1 g of 35% hydrochloric acid and, after obtaining a homogeneous solution, 60 g of powdery polyacrylamide (average molecular weight about $1400\times10^4$) was further added. The mixture was stirred to attain a condition of roughly uniform dispersion; it soon became a gel-like mass. This was maintained in a water bath at 50° C. for 20 days, whereupon it became a uniform aqueous polymer solution. This solution was further adjusted to pH 5.5, the unreacted hydrogen peroxide was then quenched by adding 1.9 g of powdery sodium hydrogen sulfite, and the polymer concentration was adjusted to 30% by adding distilled water to give 200 g of the desired aqueous polymer solution. The average molecular weight of the polymer in this aqueous solution was determined by GPC and found to be about $5\times10^4$. The results are shown in Table 1.

TABLE 1

| Example | Starting polymer Composition | Mol. wt. | Oxidizing agent addition level | Mol. wt. after reaction | 30% viscosity | Sample No. |
|---|---|---|---|---|---|---|
| 1 | p-DMQ/AAM | $1000 \times 10^4$ | 10% | $4 \times 10^4$ | 460 | 1 |
| 2 | p-DD | $80 \times 10^4$ | 10% | $4 \times 10^4$ | 400 | 2 |
| 3 | p-DD | $80 \times 10^4$ | 1.5% | $20 \times 10^4$ | 2100 | 3 |
| 4 | P-AMZ | $300 \times 10^4$ | 5.1% | $3 \times 10^4$ | 196 | 4 |
| 5 | P-AMZ | $300 \times 10^4$ | 0.5% | $15 \times 10^4$ | 2540 | 5 |
| 6 | p-AAM | $1400 \times 10^4$ | 2.0% | $5 \times 10^4$ | 730 | 6 | p-DMQ/AAM: acryloyloxyethyltrimethylanmionium chloride/acrylamide copolymer,
P-AMZ: polyamidine,
p-DD: poly(diallyldimethylammonium chloride),
p-AAM: acrylamide polymer
Oxidizing agent addition level: % by mass relative to the polymer, 30% viscosity: mPa · s

EXAMPLE 7

A 171.4-g portion of the unadjusted aqueous polymer solution obtained in Example 1 was taken out, the solution pH was adjusted to 5.5, the unreacted hydrogen peroxide was then quenched by adding 1.9 g of powdery sodium hydrogen sulfite, 2.5 g of trimethylamine hydrochloride was added and, then, the polymer concentration was adjusted to 30% by adding distilled water to give 200 g of the desired aqueous polymer solution. The viscosity of this solution was determined using a rotational viscometer and found to be 436 mPa·s. It was thus confirmed that the viscosity was lower than that of the aqueous polymer solution prepared in Example 1 without adding trimethylamine hydrochloride. The results are shown in Table 2.

EXAMPLES 8 TO 16

Various additives were admixed with the polymers reduced in molecular weight as synthesized in Examples 1 to 6 by the same procedure as in Example 7, and the solution viscosities were measured. The results are shown in Table 2.

TABLE 2

| Example | Raw material sample No. | Additive | Additive addition level | 30% viscosity | Sample No. after admixture |
|---|---|---|---|---|---|
| 7 | 1 | TMA · HCl | 4.2 | 336 | 7 |
| 8 | 1 | NaCl | 2.5 | 328 | 8 |
| 9 | 1 | p-DD | 5 | 532 | 9 |
| 10 | 2 | 2SF | 3.3 | 326 | 10 |
| 11 | 2 | NaCl | 2.5 | 354 | 11 |
| 12 | 2 | p-DMQ | 6.7 | 454 | 12 |
| 13 | 4 | AMA | 3.3 | 126 | 13 |
| 14 | 4 | NaCl | 2.5 | 145 | 14 |
| 15 | 4 | p-Vam | 5 | 265 | 15 |

TMA · HCl: trimethylamine hydrochloride,
p-DD: poly(diallyldimethylammonium chloride),
2SF: disodium fumarate,
p-DMQ: acryloyloxyethyltrimethylammonium chloride polymer,
AMA: ammonium acetate,
p-VAm: polyvinylamine (added in the acetate form),
additive addition level: % by mass relative to the polymer,
30% viscosity: mPa · s

EXAMPLES 16 TO 20

[Preparation of Ink Jet Recording Paper]
Finely pulverized silica (Nippon Silica Industrial's HD-2), polyvinyl alcohol (Kuraray's PVA-103) and each of the aqueous polymer solutions obtained in Examples 1-5 as a fixing agent were added, in the solid mass ratio of 50:47:3, to pure water and uniformly mixed up to give a coating composition with a solid matter concentration of 23%, which was applied to commercial PPC paper (StØchigt sizing degree about 20 seconds) at a coating weight of about 2 g of polymer solid/m using a wire bar, followed by 2 minutes of drying on a rotating drum drier. Ink jet recording paper sheets were thus prepared.

[Evaluation of the Ink Jet Recoding Paper Sheets]
Each coated paper sheet was printed all over with one of the black, cyan, magenta and yellow colors using Epson's ink jet printer PM-750C, and the printed sheet was evaluated in the following manner. Each numerical value in the table indicates the rate of reduction relative to the numerical value after printing and a greater value means a better effect. The results are shown in Table 3.

Color density: the measured value of each color density using a densitometer (Macbeth RD-918).

Water resistance: the percentage of change in color density after 20 minutes of immersion of the coated paper sheet printed all over in 3 liters of running water per minute.

Light fastness: the percentage of change in color density after 24 hours of irradiation in a fade-o-meter (Toyo Seiki Seishaku-sho Suntest CPS+) at a temperature of 50° C. and at an irradiation intensity of 500 W/m$^2$.

COMPARATIVE EXAMPLES 1 TO 3

Using, as a fixing agent, a 20% aqueous solution of poly(acryloyloxyethyltrimethylammonium chloride) (produced by the conventional aqueous solution polymerization method, weight average molecular weight $35\times10^4$) (Comparative Example 1), an aqueous solution of poly(diallyldimethylammonium chloride) (produced by the conventional aqueous solution polymerization method, weight average molecular weight $20\times10^4$) (Comparative Example 2) or an aqueous solution of polyamidine (produced by the conventional aqueous solution polymerization method, weight average molecular weight $50\times10^4$) (Comparative Example 3), ink jet printing paper sheets were produced and evaluated in the same manner as in Examples 16-20. The results are shown in Table 3.

EXAMPLES 21 TO 29

Using each of the aqueous polymer solutions obtained in Examples 7 to 15 as a fixing agent, ink jet printing paper sheets were produced and evaluated in the same manner as in Examples 16-20. Each numerical value in Table 4 indicates the rate of reduction relative to the numerical value after printing and a greater value means a better effect. The results are shown in Table 4.

COMPARATIVE EXAMPLES 4 TO 6

As comparative tests, ink jet recording paper sheets were produced and evaluated in the same manner as in Examples 16-22 using the unadjusted aqueous polymer solutions obtained in Examples 1, 2 and 4 without addition of any additive. The results are shown in Table 4.

TABLE 3

|  | Color density | | | | Water resistance test | | | | Light fastness test | | | |
| --- | --- | --- | --- | --- | --- | --- | --- | --- | --- | --- | --- | --- |
|  | Black | Magenta | Cyan | Yellow | Black | Magenta | Cyan | Yellow | Black | Magenta | Cyan | Yellow |
| Example 16 | 1.57 | 1.24 | 1.58 | 1.24 | −16.1% | −19.3% | −3.4% | −8.0% | −21.6% | −20.6% | −4.7% | −9.8% |
| Example 17 | 1.64 | 1.29 | 1.65 | 1.32 | −14.0% | −19.8% | −2.2% | −8.1% | −22.9% | −23.4% | −4.4% | −12.6% |
| Example 18 | 1.64 | 1.30 | 1.67 | 1.33 | −13.7% | −19.5% | −2.0% | −7.9% | −22.7% | −23.1% | −4.6% | −12.7% |
| Example 19 | 1.59 | 1.24 | 1.60 | 1.25 | −16.4% | −20.2% | −4.8% | −6.7% | −22.2% | −21.5% | −3.6% | −9.8% |
| Example 20 | 1.61 | 1.23 | 1.62 | 1.24 | −16.2% | −19.9% | −4.4% | −6.4% | −22.4% | −22.7% | −3.3% | −9.7% |
| Compar. Ex. 1 | 1.52 | 1.18 | 1.53 | 1.25 | −18.0% | −20.8% | −6.4% | −10.7% | −25.8% | −26.9% | −8.2% | −15.0% |
| Compar. Ex. 2 | 1.55 | 1.21 | 1.54 | 1.22 | −19.0% | −21.3% | −7.6% | −10.1% | −24.2% | −25.5% | −8.7% | −15.3% |
| Compar. Ex. 3 | 1.51 | 1.20 | 1.52 | 1.20 | −19.2% | −22.3% | −9.4% | −11.8% | −23.3% | −24.7% | −9.9% | −14.2% |

TABLE 4

|  | Color density | | | | Water resistance test | | | | Light fastness test | | | |
| --- | --- | --- | --- | --- | --- | --- | --- | --- | --- | --- | --- | --- |
|  | Black | Magenta | Cyan | Yellow | Black | Magenta | Cyan | Yellow | Black | Magenta | Cyan | Yellow |
| Example 21 | 1.59 | 1.23 | 1.57 | 1.26 | −16.2% | −19.8% | −3.7% | −7.5% | −21.9% | −20.4% | −9.7% | −9.8% |
| Example 22 | 1.58 | 1.24 | 1.60 | 1.24 | −16.1% | −19.5% | −3.6% | −8.1% | −21.8% | −20.7% | −9.6% | −12.6% |
| Example 23 | 1.60 | 1.27 | 1.63 | 1.27 | −15.8% | −18.9% | −3.5% | −7.4% | −21.7% | −20.3% | −9.5% | −12.7% |
| Example 24 | 1.65 | 1.28 | 1.67 | 1.30 | −13.9% | −19.7% | −2.2% | −8.1% | −23.2% | −23.3% | −12.4% | −9.8% |
| Example 25 | 1.66 | 1.27 | 1.66 | 1.31 | −14.2% | −19.9% | −2.2% | −8.1% | −22.7% | −23.2% | −12.7% | −9.7% |
| Example 26 | 1.64 | 1.31 | 1.66 | 1.32 | −13.5% | −19.5% | −1.8% | −8.0% | −22.9% | −23.8% | −13.0% | −12.6% |
| Example 27 | 1.60 | 1.25 | 1.60 | 1.26 | −16.5% | −20.0% | −4.7% | −6.5% | −22.0% | −21.2% | −10.2% | −12.7% |
| Example 28 | 1.59 | 1.23 | 1.61 | 1.27 | −16.4% | −20.3% | −4.5% | −6.4% | −21.9% | −21.4% | −10.1% | −9.8% |
| Example 29 | 1.61 | 1.25 | 1.61 | 1.25 | −15.6% | −18.9% | −4.1% | −6.0% | −22.1% | −21.0% | −10.3% | −9.7% |
| Compar. Ex. 4 | 1.57 | 1.24 | 1.58 | 1.24 | −16.1% | −19.3% | −3.4% | −8.0% | −24.6% | −24.6% | −13.8% | −15.0% |
| Compar. Ex. 5 | 1.64 | 1.29 | 1.65 | 1.32 | −15.9% | −19.8% | −3.1% | −8.1% | −24.9% | −23.4% | −14.0% | −15.3% |
| Compar. Ex. 6 | 1.59 | 1.24 | 1.60 | 1.25 | −16.4% | −20.2% | −4.8% | −8.7% | −23.8% | −25.5% | −14.1% | −14.2% |

The results shown in Table 3 and Table 4 indicate that the water-soluble polymers reduced in molecular weight according to the invention show better performance characteristics, in particular in light fastness, as ink jet fixing agents as compared with the polymers obtained by the conventional aqueous solution polymerization technique. While the impurities in the water-soluble polymers used as fixing agents are said to adversely affect the light fastness of ink jet recording paper sheets, the water-soluble polymers produced by the process of the invention presumably showed improved light fastness because of low contents of undesirable impurities therein. It is also seen that the additive-containing samples showed improved levels of light fastness.

INDUSTRIAL APPLICABILITY

The industrial use value of the invention is very high since a water-soluble polymer reduced in molecular weight can be obtained by a simple procedure and in an economical and simple manner by subjecting an aqueous solution admixed with an aqueous solution of an oxidizing agent and containing an amount within the range of 10-60% by mass of a water-soluble polymer and having a viscosity of not lower than 3000 mPa·s or a granular composition admixed or impregnated with an aqueous solution of an oxidizing agent and containing an amount within the range of 10-60% by mass of a water-soluble polymer to oxidation reaction, not by the method of polymerization at elevated temperatures, which is an energy-consuming method, or by the method of polymerization using large amounts of a chain transfer agent and/or an initiator, which is one of the raw materials, and since this water-soluble polymer reduced in molecular weight can be used as a fixing agent for improving the water resistance and/or light fastness of printed matters and, further, the solution viscosity of this water-soluble polymer reduced in molecular weight can be adjusted, hence the handleability thereof, among others, can be adjusted, by incorporating a water-soluble salt and/or a polymer additive in this water-soluble polymer reduced in molecular weight to give a composition comprising the water-soluble polymer reduced in molecular weight.

The invention claimed is:

1. A water-soluble polymer reduced in molecular weight as obtained by subjecting either an aqueous solution admixed with an aqueous solution of an oxidizing agent and containing an amount within the range of 10-60% by mass of a water-soluble polymer and having a viscosity of not lower than 3000 mPa·s determined using a rotation viscometer or a granular composition admixed or impregnated with an aqueous solution of an oxidizing agent and containing an amount within the range of 10-60% by mass of a water-soluble polymer to oxidation reaction to thereby reduce the degree of polymerization of the water-soluble polymer, characterized in that the oxidation reaction is carried out without stirring and the water-soluble polymer is a cationic water-soluble polymer comprising at least one structural unit selected from among the cationic structural units represented by the general formulas (1) to (4) given below:

General formula (1)

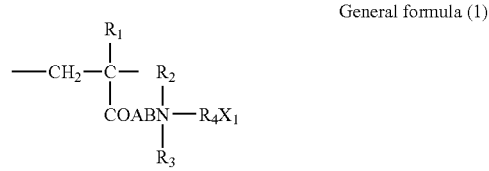

wherein $R_1$ is a hydrogen atom or a methyl group, $R_2$ and $R_3$ each is an alkyl or alkoxyl group containing 1-3 carbon atoms, $R_4$ is a hydrogen atom, an alkyl or alkoxyl group containing 1-3 carbon atoms or a benzyl group, and $R_1$-$R_4$ may be the same or different, A represents an oxygen atom or NH, B represents an alkylene or alkoxylene group containing 2-4 carbon atoms, and $X_1$ represents an anion;

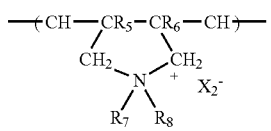

General formula (2)

wherein $R_5$ and $R_6$ each represents a hydrogen atom or a methyl group, $R_7$ and $R_8$ each represents an alkyl or alkoxyl group containing 1-3 carbon atoms or a benzyl group, and $X_2$ represents an anion;

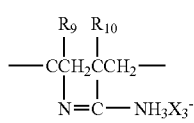

General formula (3)

wherein $R_9$ and $R_{10}$ each represents a hydrogen atom or a methyl group and $X_3$ represents an anion; and

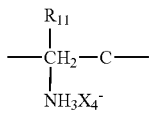

General formula (4)

wherein $R_{11}$ represents a hydrogen atom or a methyl group and $X_4$ represents an anion.

2. A water-soluble polymer reduced in molecular weight as set forth in claim 1 obtained by subjecting either an aqueous solution admixed with an aqueous solution of an oxidizing agent and containing an amount within the range of 10-60% by mass of a water-soluble polymer and having a viscosity of not lower than 3000 mPa·s determined by using a rotation viscometer or a granular composition admixed or impregnated with an aqueous solution of an oxidizing agent and containing an amount within the range of 10-60% by mass of a water-soluble polymer to oxidation reaction to thereby reduce the degree of polymerization of the water-soluble polymer, characterized in that the oxidation reaction is carried out without stirring and the water-soluble polymer is an amphoteric water-soluble polymer comprising at least one structural unit selected from among the cationic structural units represented by the general formulas (1) to (4) of claim 4 and at least one anionic structural unit represented by the general formula (5) given below:

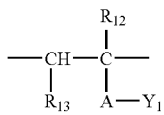

General formula (5)

wherein $R_{12}$ represents a hydrogen atom or a methyl or carboxymethyl group, A represents $SO_3$, $C_6H_4SO_3$, $CONHC(CH_3)_2CH_2SO_3$, $C_6H_4COO$ or COO, $R_{13}$ represents a hydrogen atom or $COOY_2$, and $Y_1$ and $Y_2$ each represents a hydrogen atom or a cation.

3. A water-soluble polymer reduced in molecular weight as obtained by subjecting either an aqueous solution admixed with an aqueous solution of an oxidizing agent and containing an amount within the range of 10-60% by mass of a water-soluble polymer and having a viscosity of not lower than 3000 mPa·s determined by using a rotation viscometer or a granular composition admixed or impregnated with an aqueous solution of an oxidizing agent and containing an amount within the range of 10-60% by mass of a water-soluble polymer to oxidation reaction to thereby reduce the degree of polymerization of the water-soluble polymer, characterized in that the oxidation reaction is carried out without stirring and the water-soluble polymer is a nonionic water-soluble polymer comprising at least one structural unit selected from among nonionic structural units represented by the general formula (6) given below:

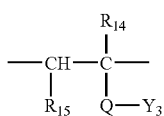

General formula (6)

wherein $R_{14}$ represents a hydrogen atom or a methyl group, $R_{15}$ represents a hydrogen atom or a lower alkyl group, and Q represents $NHCOR_{16}$ in which $R_{16}$ is a hydrogen atom or a lower alkyl group, or COA in which A is NH or O and $Y_3$ represents a hydrogen atom.

4. A water-soluble polymer composition characterized in that it comprises a water-soluble polymer reduced in molecular weight as defined in any of claims 1 to 3, together with a water-soluble salt and/or a polymer additive caused to coexist.

5. The water-soluble polymer composition as set forth in claim 4 characterized in that the coexisting salt is an organic acid salt or an organic base salt.

6. A water-soluble polymer composition as set forth in claim 4 characterized in that the coexisting polymer additive is polyethylene glycol, polypropylene glycol, polyglycerol, polyvinylpyrrolidone, polyethylenimine or a polymeric compound comprising at least one of the structural units represented by the general formulas (1) to (6).

* * * * *

UNITED STATES PATENT AND TRADEMARK OFFICE
CERTIFICATE OF CORRECTION

PATENT NO.       : 7,732,527 B2
APPLICATION NO.  : 10/546093
DATED            : June 8, 2010
INVENTOR(S)      : Motosuke Ono It is certified that error appears in the above-identified patent and that said Letters Patent is hereby corrected as shown below:

Column 3, lines 1-9, General formula (2) should read as follows:

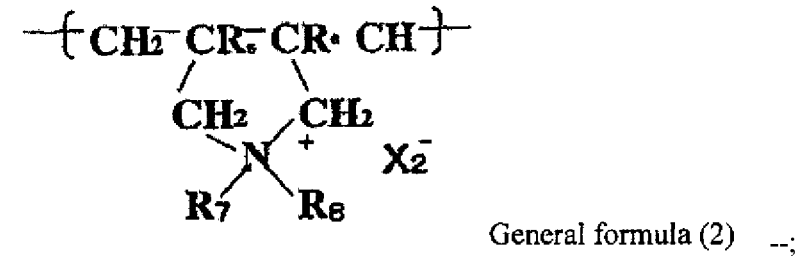

-- General formula (2) --;

Column 17, claim 1, lines 5-10, General formula (2) should read as follows:

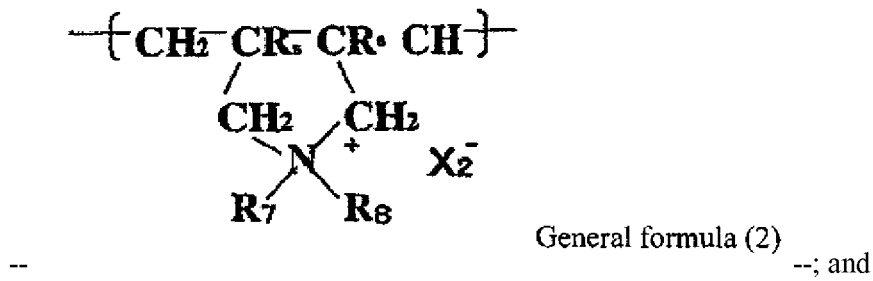

-- General formula (2) --; and

Column 17, claim 2, line 56, "claim 4" should read --claim 1--.

Signed and Sealed this
Twentieth Day of December, 2011

David J. Kappos
*Director of the United States Patent and Trademark Office*